United States Patent
Piccolotto et al.

(10) Patent No.: US 10,331,945 B2
(45) Date of Patent: Jun. 25, 2019

(54) FAIR, SECURED, AND EFFICIENT COMPLETELY AUTOMATED PUBLIC TURING TEST TO TELL COMPUTERS AND HUMANS APART (CAPTCHA)

(71) Applicant: INTEL CORPORATION, Santa Clara, CA (US)

(72) Inventors: Jose P. Piccolotto, Córdoba (AR); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 14/979,206

(22) Filed: Dec. 22, 2015

(65) Prior Publication Data

US 2017/0180348 A1    Jun. 22, 2017

(51) Int. Cl.
*G06K 9/00* (2006.01)
*H04L 29/06* (2006.01)

(52) U.S. Cl.
CPC ..... *G06K 9/00355* (2013.01); *G06K 9/00288* (2013.01); *G06K 9/00906* (2013.01); *H04L 63/0861* (2013.01); *G06F 2221/2133* (2013.01)

(58) Field of Classification Search
None
See application file for complete search history.

(56) References Cited

U.S. PATENT DOCUMENTS

| 2008/0317357 A1 | 12/2008 | Steinberg et al. |
| 2009/0083850 A1 | 3/2009 | Fadell et al. |
| 2009/0319270 A1 | 12/2009 | Gross |
| 2011/0023110 A1 | 1/2011 | Freund et al. |
| 2012/0183270 A1* | 7/2012 | Greenblatt ............. G06F 21/34 386/224 |
| 2012/0222100 A1* | 8/2012 | Fisk ...................... G06F 21/316 726/7 |

(Continued)

FOREIGN PATENT DOCUMENTS

JP    2010039849 A  *  2/2010    ............. G07B 15/00

OTHER PUBLICATIONS

McKerrow et al., "Classifying still faces with ultrasonic sensing", Aug. 24, 2007, pp. 1-17.*

(Continued)

*Primary Examiner* — Joseph P Hirl
*Assistant Examiner* — Hassan Saadoun
(74) *Attorney, Agent, or Firm* — Grossman, Tucker, Perreault & Pfleger, PLLC

(57) ABSTRACT

A mechanism is described for facilitating fair, secured, and efficient completely automated public turing test to tell computers and humans apart (CAPTCHA) according to one embodiment. A method of embodiments, as described herein, includes receiving distinctive data relating to a user, where the distinctive data includes a video clip of the user, where the distinguishing data is captured using one or more cameras. The method may further include recognizing one or more features of the user from the video clip to determine whether the user is a human, and testing one or more characteristics of the user or the video clip to determine whether the human is a live human. The method may further include allowing access to the user to an application, if the user is determined to be the live human.

25 Claims, 7 Drawing Sheets

(56) References Cited

U.S. PATENT DOCUMENTS

2015/0186711 A1* 7/2015 Baldwin ............ G06K 9/00228
382/118

OTHER PUBLICATIONS

Notification of Transmittal of the International Search Report and the Written Opinion of the International Searching Authority issued for International Patent Application No. PCT/US2016/056858, dated Jan. 13, 2017.

* cited by examiner

FAIR, SECURED, AND EFFICIENT COMPLETELY AUTOMATED PUBLIC TURING TEST TO TELL COMPUTERS AND HUMANS APART (CAPTCHA)

FIELD

Embodiments described herein generally relate to computers. More particularly, embodiments relate to facilitating a fair, secured, and efficient completely automated public turing test to tell computers and humans apart (CAPTCHA).

BACKGROUND

Conventional CAPTCHA (also interchangeably referred to as reverse Turing Test (RTT)) techniques principally rely on text being represented as images and optical character recognition (OCR) algorithms to convert the images back to text. However, these conventional CAPTCHA techniques are severely deficient in terms of being inconvenient, insensitive, unfair, inefficient, limited in the use of input/output (I/O) components and platforms, etc.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for using facial recognition, visual representations, emotion and context sensing, passive liveliness, any number and type of I/O components (e.g., sensors, peripherals, displays, keyboards, cameras, etc.), any number and type of platforms (e.g., browsers, mobile applications, Internet of Things (IoT) devices, smart wearable devices, mobile devices, etc.), while being independent of user's restrictions or lack of capabilities (e.g., handicaps, emotional state, etc.), to provide for an intelligent selection and application of CAPTCHA that is fair, secured, and efficient.

As aforementioned, conventional CAPTCHA techniques are inconvenient as most people find their experience to invoke negative emotions. Further, conventional CAPT-CHA is regarded as offensive and insensitive to individuals with disabilities as it may prevent or deny access (e.g., access to an email account) to such persons, which is considered in contrast with most laws requiring accommodation for the disabled. Moreover, conventional CAPTCHA is limited to regular keyboard inputs and display outputs to present an RTT, which serves as an added limitation and inconvenience.

Embodiments provide for a smart and novel CAPTCHA technique that performs evaluation of users' disabilities through one or more sensors, such as health monitoring sensors, choice of or ability to use various peripherals and I/O devices, accessibility settings and personal health records of users, such as according to user preferences and consideration of application privacy regulations (e.g., Health Insurance Portability and Accountability Act (HIPPA)).

It is contemplated and to be noted that embodiments are not limited to any particular number and type of powered devices, unpowered objects, software applications, application services, customized settings, etc., or any particular number and type of computing devices, networks, deployment details, etc.; however, for the sake of brevity, clarity, and ease of understanding, throughout this document, references are made to various sensors, cameras, microphones, speakers, display screens, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 1:
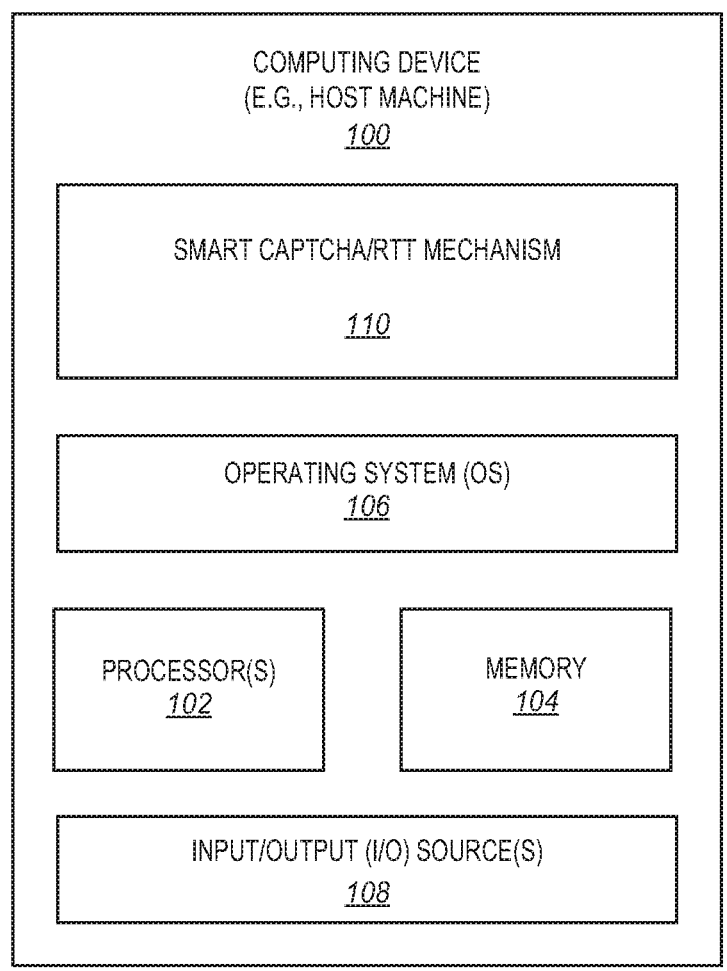
FIG. 1 illustrates a computing device employing a smart CAPTCHA/RTT mechanism according to one embodiment.
Figure 2:
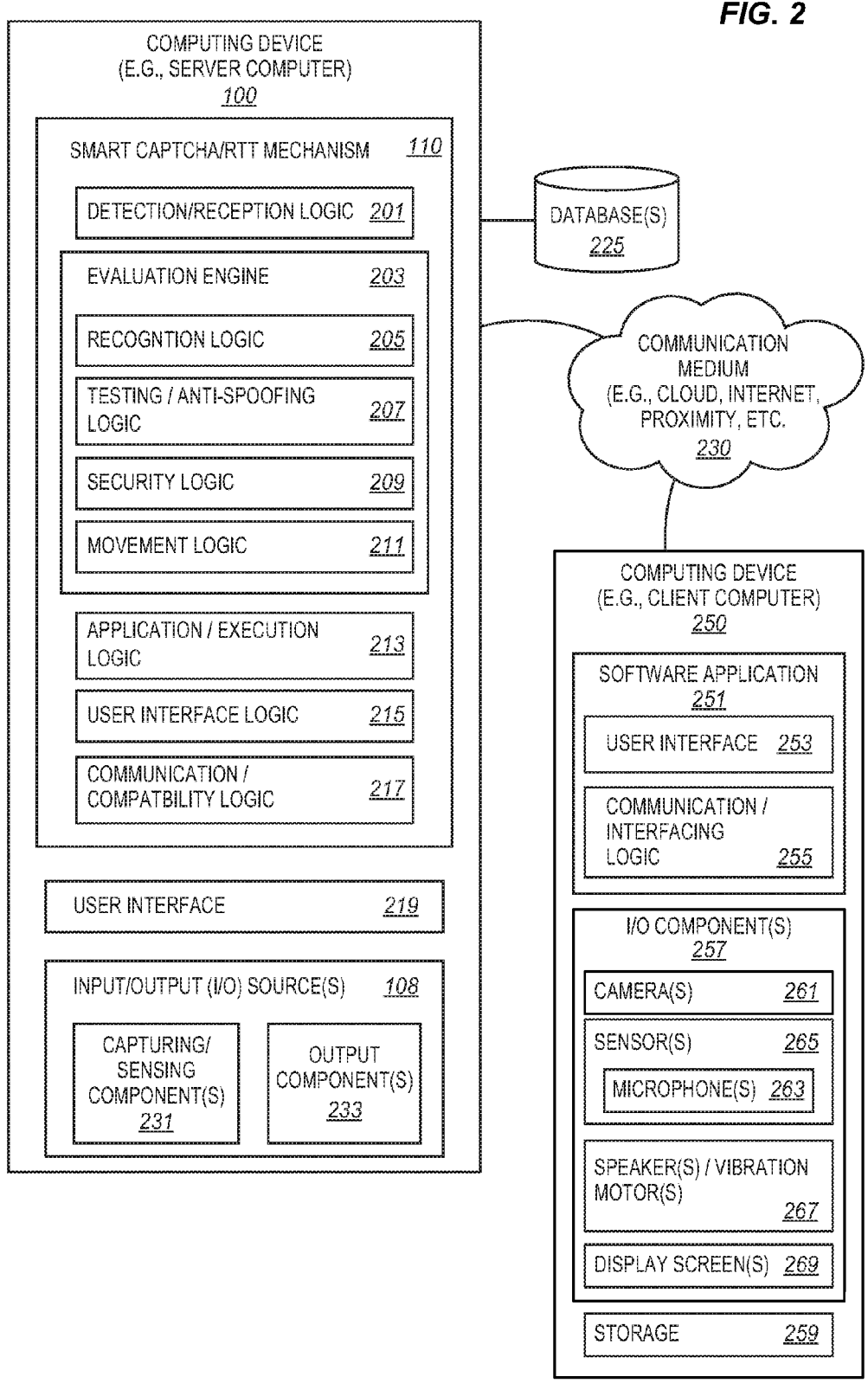
FIG. 2 illustrates a smart CAPTCHA/RTT mechanism according to one embodiment.

FIG. 1 illustrates a computing device 100 employing a smart CAPTCHA/RTT mechanism 110 according to one embodiment. Computing device 100 (e.g., server computer, desktop computer, mobile computer, etc.) serves as a host machine for hosting smart CAPTCHA/RTT mechanism ("smart mechanism") 110 that includes any number and type of components, as illustrated in FIG. 2, to facilitate smart testing tasks to tell humans and non-humans apart, as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, head-mounted binoculars, gaming displays, military headwear, etc.), and other wearable devices (e.g., smartwatches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to one or more computing devices, such as computing device 100.

FIG. 2 illustrates a smart CAPTCHA/RTT mechanism 110 according to one embodiment. In one embodiment, smart mechanism 110 may include any number and type of components, such as (without limitation): detection/reception logic 201; evaluation engine 203 including recognition logic 205, testing/anti-spoofing logic 207, security logic 209, movement logic 211; application/execution logic 213; user interface logic 215; and communication/compatibility logic 217.

In one embodiment, computing device 100 may include a server computer (e.g., cloud-based server, Web server, etc.) is further shown as hosting I/O sources 108 having capturing/sensing components 231 and output sources 233. In one embodiment, capturing/sensing components 231 may include sensor array (such as microphones or microphone array (e.g., ultrasound microphones), cameras or camera array (e.g., two-dimensional (2D) cameras, three-dimensional (3D) cameras, infrared (IR) cameras, depth-sensing cameras, etc.), capacitors, radio components, radar components, etc.), scanners, etc., while output components may include display screens/devices, projectors, speakers, etc.

Computing device 100 is further illustrated as being in communication with other computing devices, such as computing device 250, over communication medium 230, such as one or more networks (e.g., cloud network, proximity network, Internet, etc.). In one embodiment, computing device 250 may include a client computer, such as any communication and/or data processing device including (without limitations) mobile computers (e.g., smartphone, tablet computers, etc.), smart wearable devices (e.g., smart watch, wearable glasses, HMDs, etc.), Internet of Things (IoT) devices, laptop computers, netbooks, desktop computers, etc.

Like I/O source(s) 108 of computing device 100, computing device 250 also includes one or more I/O component(s) 257, such as one or more cameras 261 (e.g., 2S/3D cameras, depth-sensing cameras, cameras, infrared (IR) cameras, etc.), capacitors, radio components, radar components, one or more microphones 263, one or more sensors 265, scanners, accelerometers, light-emitting diodes (LEDs), one or more speakers and/or vibration motors 265, projectors, display screens 267, etc.). Computing device 250 is further shown to host a client-side software application 251 including user interface 253 (e.g., graphical user interface (GUI)-based user interface, such as a Web browser, mobile application-based user interface, etc.) and communication/interface logic 255, and storage medium 259.

Further, in one embodiment, smart mechanism 110 may be entire hosted by a server computer, such as computing device 100, or, in another embodiment, one or more components or all of smart mechanism 110 may be hosted by a client computer, such as computing device 250. For example, software application 251 at computing device 250 may be a client-based software application complimenting smart mechanism 110 at computing device 100, where, for example, user interface logic 215 may provide user interface 219 at computing device and, in some embodiments, also provide user interface 253 of software application 251 as further facilitated by communication/interfacing logic 255.

In one embodiment, computing device 100 may be further in communication with one or more repositories, data sources, databases, such as database(s) 225, having any amount and type of information, such as data, metadata, etc., relating to any number and type of applications, such as human features/characteristics data, visual/voice recognition data, security data, relevant metadata, user preferences and profiles, and/or the like.

Referring back to smart mechanism 110 and software application 251, for example, a user (such as an individual having access to computing device 250) may attempt to perform a task (e.g., open an email account) that triggers software application 251 to enquire from the user some relevant data to determine whether the user is in fact a human or a non-human. In one embodiment, using user interface 253 (e.g., Internet browser, mobile application-based user interface), the user may be ask to provide a scan or picture of their face. For example, a camera, such as camera 261, of I/O component(s) 257 may be triggered to capture a picture and/or a video stream of the user's face so that a liveness test (e.g., the user is human and alive as opposed to being a photo, etc.) may be performed to determined whether the user is a real human.

In one embodiment, a video clip may include a three-dimensional (3D) depth-sensing video clip obtained using a depth-sensing camera (e.g., Intel® RealSense® camera), where the 3D depth-sensing video clip provides a 2D special representation of facial features capable of being verified according to a plurality of 3D human features at a database. A video clip may further include images obtained using infrared (IR) sensing components such that a heat pattern consistent with live humans is matched. A video may further include an ultrasonic reflection of an object returning reflection patterns consistent with a shape of a human face or other body parts.

Once the picture and/or the video stream of the user has been obtained by camera 261, this information may then be communicated over to detection/reception logic 201 of smart mechanism 110 over communication medium 230 (e.g., cloud network, the Internet, etc.) as facilitated by communication logic 255 and communication/compatibility logic 217. Upon receiving the information, detection/reception logic 201 the forwards the information, or at least the relevant portions of the information, to evaluation engine 203 to perform the necessary and relevant tests to authenticate the user to be a living human as opposed to a computer or another non-living object.

For example, in one embodiment, recognition logic 205 may be triggered to use one or more facial recognition algorithms to perform one or more recognition tests to determine whether the picture or video of the user's face at least reveals the face is a human face, such as from a predetermine effective range of, for example, 23 inches. It is contemplated that a great deal of research, encompassing numerous individuals over any number of cultures and nations, etc., may be performed along with or as supported by scientific research to provide accurate recognition features which may be stored at database(s) 225 and accessible to evaluation engine 203 for various tasks, such as comparisons, matches, etc. For example, recognition logic 205 may access database(s) 225 to match one or more facial features (e.g., skin colors, distance between eyes, placement of the nose, fullness of the lips, etc.) of the user as captured by camera 261 with one or more corresponding facial features at database(s) 225. If the match fails, recognition logic 203 may return the verdict of failure and either an error may be issued to the user via user interface 253 or a repeat test may be performed with the same data or slightly altered data or within a range of data.

It is contemplated that embodiments are not limited to merely facial image or representation and that in some embodiments, other parts of the body, such as the palm of the user's hand, only the eyes, etc., may be used recognition purposes. Similarly, in some embodiments, images or video streams may not be used all together and that the recognition, as facilitated by recognition logic 205, may based on voice, such as the user uttering one or more words or making random sounds within a proximity of one or more microphones 263 to be captured and communicated over to smart mechanism 110 for further processing. Similarly, certain biometric readings, such body temperature, fingerprints, etc., of the user, etc., may be obtained using one or more sensors 265, which may then be communicated over to smart mechanism 110 for further processing.

Further, for example, recognition logic 205 and any one or more of other components 207, 209, 211 of evaluation engine 203 may be used to determine and evaluate any number and type of factors relating to the user being a human or not, such as evaluating the user's emotional state by monitoring the user's facial expressions as captured by camera 261, voice intonations as detected by one or more microphones 263, perspiration, body temperature, pulse and brainwaves, etc., as determined from bio-feedback as performed by one or more biosensors of sensors 265, and/or the like. It is contemplated that any number and type of noninvasive bio-feedback devices or sensors (e.g., swallow-able implants, wearable devices, etc.) may be used for emotional sensing, biometric readings, and other such realistic propositions. However, for the sake of brevity and clarity, throughout this document, face, facial features, and facial recognition, etc., are discussed for exemplary purposes but that embodiments are not limited as such.

In one embodiment, upon performing primary evaluation and assessment of the facial features/expression from the images and/or video stream of the user's face, the recognition-related data as determined by recognition logic 205 may then be forwarded on to testing/anti-spooking logic 207 for additional processing and further testing. For example, in some embodiments, even if the face is determined to be a human face (such as when compared with human face-related data at database(s) 225) by recognition logic 205, whether this human face is merely a photograph or is it in face a living human face may not yet be known. In one embodiment, upon receiving the recognition data, testing/anti-spoofing logic 207 may perform one or more anti-spoofing tests (e.g., passive liveness recognition tests, etc.) to determine whether the human is real and not a video or a picture (of the user) being displayed in front of camera 261 at computing device 250.

In one embodiment, these one or more anti-spoofing tests, as facilitated by testing/anti-spoofing logic 207, may include (for example and without limitations) detecting of the glare on the user's face, reflection on the user's face that may have been produced by a picture or the screen of a table computer or a monitor in from of camera 261, blink detection to detect the blinks and count their speed and/or frequency to detect whether the blinks are being performed by a live human or some in a video, and/or the like.

In one embodiment, merely detecting whether the user is a human or a non-human might be sufficient; however, in another embodiment, one or more added layers of security may be employed, as facilitated by security logic 209, which may include asking the user to perform one or more acts, such as moving in front of camera 261 to mimic a specific pose (e.g., moving face from right-left, upon-down, showing a close-up of an ear or an eye, waving a hand, etc.). In case of certain user movements, whether they are random or planned, movement logic 211 may be triggered to authenticate or verify these user's movements to ensure they match or fail to match with any corresponding movements at database(s) 225. Such security measures may be taken in case of more secured accesses (such as to sensitive files, confidential company information, etc.) to ensure that the user is not only a human, but also an authorized human.

It is contemplated that any number and type of user presence-sensing techniques may be employed to establish user presence, such as trusted execution environment (TEE) on a client platform (e.g., Intel® Software Guard Extensions (SGX), Converged Security and Manageability Engine (CSME), System Management Mode (SMM), etc.), where TEE is used to protect sensory data from manipulation by botware or malware that may attack the client platform that is part of a bot attack on a cloud service. For example, simply moving the RTT evaluation, such as one or more components of smart mechanism 110, to a client device, such as computing device 250, may be sufficiently strong to detour bot attack. Further, TEE may use a unique identification (ID), such as an Intel® Enhanced Privacy ID (EPID), etc., to project a message being sent from the TEE to a Web server, such as computing device 100, attesting to the user presence status. Further, an EPID group may include a large community of users to protect privacy of individuals and their biometric, health, and other sensitive information, where a traditional web logon credentials is accompanies by an assertion of merely the user presence.

Moreover, one or more attestation techniques may be used, such as using attestation (e.g., as described by EPID protocol, Trusted Computing Group (TCG) protocol, etc.) to establish trust in a frontend TEE for making the presence assertions to a backend TEE while protecting the Web server-specific user credentials.

As previously described, embodiments provide for convenient, secured, and dignified testing for users with various disabilities, such as blindness, cognitive disabilities, etc. Conventional CAPTCHAs are not considerate of such users, requiring the use of keyboards, display screens, etc., which typically means that such users are incapable of working with most IoT devices and other form factors that do not support such I/O peripherals. Embodiments provide for the use of facial features/expressions, noise/sound, biometric readings, etc., to overcome the input portion for users with disabilities, where such inputs do not require the use of keyboard, mouse, etc. Similarly, embodiments not only provide for display output, such as using one or more display screen(s) 267, but also through sounds/noise and other forms, such as vibration, users one or more of speaker(s) and/or vibration motor(s) 265, etc. For example, a hearing-impaired user may choose to view through display screen 267, while a user lacking sight may choose to listen in to sounds/noises or feel vibration as facilitated by one or more speakers/vibration motors 265.

Capturing/sensing components 231 at computing device 100 and I/O components 257 at computing device 250 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 and I/O components 257 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing components 231 and I/O components 257 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 and I/O components 257 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing components 231 and I/O components 257 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and TEE logic. TEE logic may be employed separately or be part of resource requestor and/or an I/O subsystem, etc. Capturing/sensing components 231 and I/O components 257 may further include voice recognition devices, photo recognition devices, facial and other body recognition components, voice-to-text conversion components, etc.

Similarly, output components 233 and I/O components 257 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 and I/O components 257 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios; however, for the sake of brevity and clarity, one or more use-case scenarios, such as the one illustrated with respect FIG. 3, are discussed throughout this document for exemplary purposes but that embodiments are not limited as such. Further, throughout this document, "user" may refer to someone having access to one or more computing devices, such as computing device 250, and may be referenced interchangeably with "person", "individual", "human", "him", "her", "child", "adult", "player", "gamer", "developer", programmer", and/or the like.

Communication/compatibility logic 217 may be used to facilitate dynamic communication and compatibility between various computing devices, such as server computer 100, client computer 250, database(s) 225, communication medium 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100, 250. In another example, "logic" may refer to or include a hardware component that is capable of being physically installed along with or as part of one or more system hardware elements, such as an application processor, a graphics processor, etc., of a computing device, such as computing device 100, 250. In yet another embodiment, "logic" may refer to or include a firmware component that is capable of being part of system firmware, such as firmware of an application processor or a graphics processor, etc., of a computing device, such as computing device 100, 250.

Further, any use of a particular brand, word, term, phrase, name, and/or acronym, such as "Completely Automated Public Turing Test To Tell Computers and Humans Apart", "CAPTCHA", "Reverse Turing Test", "RTT", "Turing Test", "TT", "human", "non-human", "facial expressions", "facial features", "movement", "security", "noise" or "sound" or "audio", "image", "video", "disabilities", "camera", "sensor", "microphone", "display screen", "speaker", "vibration motor", "recognition", "authentication", "LED", "sensor array", "camera", "microphone array", "accelerometer", "object", "device", "identification", "ID", "secured", "privacy", "user", "user profile", "user preference", "user", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from smart mechanism 110 to facilitate various embodiments including adding, removing, and/or enhancing certain features. For brevity, clarity, and ease of understanding of smart mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
FIG. 3A, 3B, 3C illustrated use-case scenarios for facilitating smart CAPTCHA/RTT according to one embodiment.
Figure 3B:
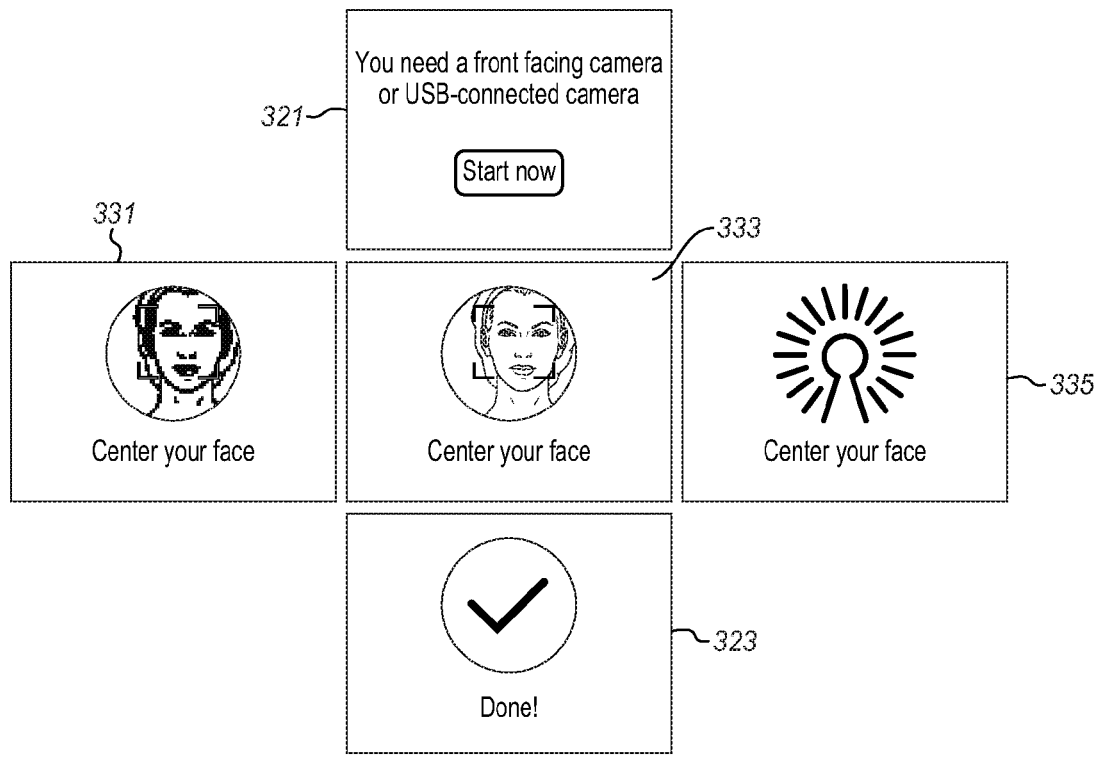
Figure 3C:
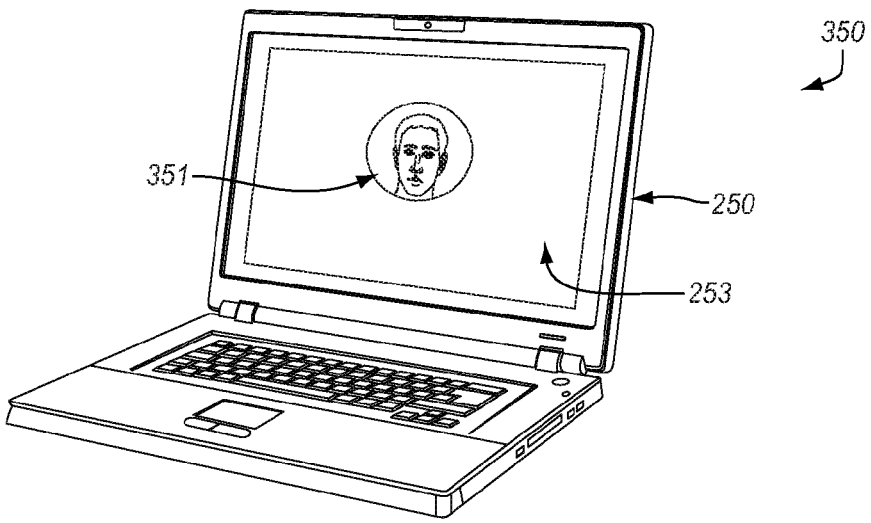

FIGS. 3A, 3B, 3C illustrated use-case scenarios 300, 320, 350 for facilitating smart CAPTCHA/RTT as facilitated by smart CAPTCHA/RTT mechanism 110 of FIG. 1 according to one embodiment. As an initial matter, for brevity, many of the details discussed with reference to the previous FIGS. 1-2 may not be discussed or repeated hereafter. Further, it is contemplated and to be noted that embodiments are not limited to any particular architectural placements, component setups, processes, and use-case scenarios, etc., such as use-case scenarios 300, 320, 350.

In FIG. 3A, in one embodiment, a screenshot is shown illustrating use-case scenario 300 of opening an email account (e.g., GMAIL®, etc.), where the initial registration page may have a primary section, such as personal section 303, requesting the user to provide some personal information, such as name, birthday, gender, etc., and create username, password, etc. Similarly, as illustrated, a conventional CAPTCHA technique may provide a secondary section, such as conventional section 301, requesting the user to input some sequence of numbers, letters, etc., for the system to determine whether the user is a human or a non-human.

In one embodiment, as facilitated by smart mechanism 110 of FIG. 1, a novel CAPTCHA section, such as novel section 311, may be offered to the user to simply face the camera, such as camera 261, of computing device, such as computing device 250, to help smart mechanism 110 determine whether the user is a human or a non-human as described with reference to FIG. 2.

FIG. 3B illustrates another use-case scenario 320 showing one or more types of interactions for performing CAPTCHA processing to verify the user's face once the user has faced a camera, at frame 321, and the camera has captured one or more images and/or video clips of the user's face. For example, in one embodiment, at frame 331, an obscured or obfuscated video/image of the user's face may be display back to the user, such as using display screen/device 267 of computing device 250 of FIG. 2. In another embodiment, at frame 333, a normal and uninterrupted or uncorrupted image/video of the face of the user may be shown, while, in yet another embodiment, at frame 335, the image/video of the user's face may not be shown at all. Once CAPTCHA is performed on the user (e.g., user verified to be human/non-human), the process ends at frame 323.

In one embodiment, these options of showing obfuscated images/videos of users, such as in frame 331, normal images/videos of users, such as in frame 333, and no images/videos of users, such as in frame 335, etc., may be chosen by default or as predetermined by smart mechanism 110 based on one or more factors, such as security of the user and/or the user's computing device (e.g., computing device 250 of FIG. 2), resources/bandwidth of the computing device (e.g., computing device 250 of FIG. 2), and/or the like. In another embodiment, any one of the three options, as shown in frames 331, 333, 335, may be explicitly selected by the user as provided in user preferences/profiles placed through user interface 253 of FIG. 2.

FIG. 3C illustrates another use-case scenario 350 where user is shown as holding a computer, such as computing device 250, and experiencing the novel CAPTCHA technique, described throughout this document, through user interface 253. In the illustrated embodiment, an image/video 351 of the user's face is shown as being captured by one or more cameras, such as camera 261 of FIG. 2, and processed using smart mechanism 110 of FIG. 1.

Figure 4:
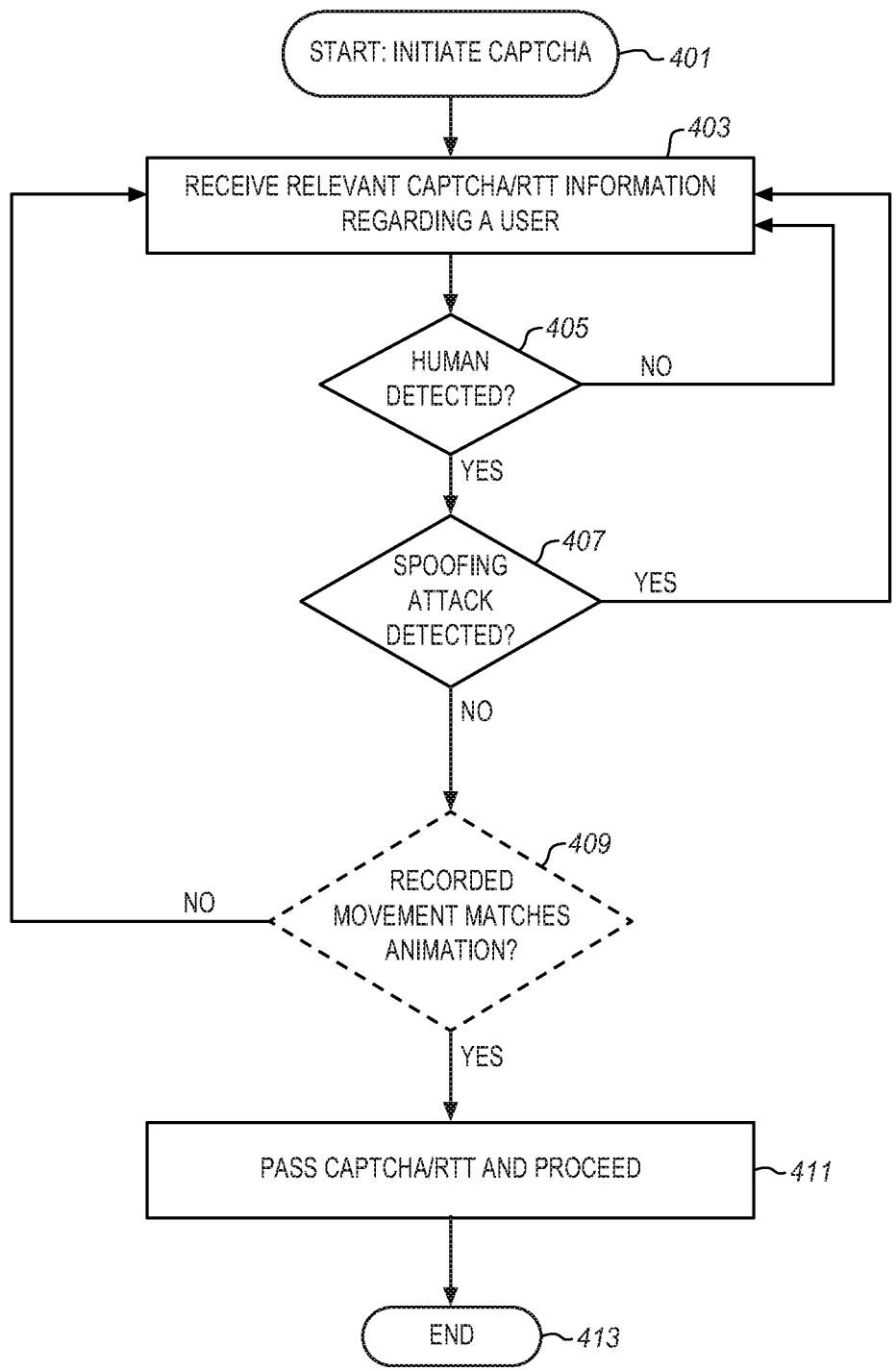
FIG. 4 illustrates a method for facilitating smart CAPTCHA/RTT according to one embodiment.

FIG. 4 illustrates a method for facilitating smart CAPTCHA/RTT as facilitated by smart CAPTCHA/RTT mechanism 110 of FIG. 1 according to one embodiment. Method 400 may be performed by processing logic that may comprise hardware (e.g., circuitry, dedicated logic, programmable logic, etc.), software (such as instructions run on a processing device), or a combination thereof, as facilitated by smart CAPTCHA/RTT mechanism 110 of FIG. 1. The processes of method 400 are illustrated in linear sequences for brevity and clarity in presentation; however, it is contemplated that any number of them can be performed in parallel, asynchronously, or in different orders. For brevity, many of the details discussed with reference to the previous FIGS. 1-3C may not be discussed or repeated hereafter.

Method 400 begins at block 401 with triggering of smart mechanism 110 of FIG. 1 at a server computer, such as computing device 100. In one embodiment, this triggering may be initiated when some form of indication is received from a client computer, such as computing device 250, that a user might be offering to accept CAPTCHA/RTT to having the privilege to access certain information, such as registering for an online email account, buying event tickets from a website, retrieving a company file from a database, accessing a home association website, etc. At block 403, any CAPTCHA/RTT-relevant data regarding the user is received over one or more networks (e.g., cloud network, Internet, etc.), where such relevant data may include (without limitation) one or more images (e.g., an image of the user's face), one or more video clips/streams (e.g., a video clip of the user's face), one or more movement patterns (e.g., random or organized movement patterns, such as moving of the face left-right, up-down, turning the face to show an ear, etc.), one or more sounds/noise (e.g., works, sentences, random noise, etc.), and/or the like. For brevity and clarity, a video stream of the user's face, indicating facial features, characteristics, expressions, etc., is used here as an example, but that embodiments are not limited as such.

In one embodiment, this relevant data may be captured at the client computer using one or more I/O components, such as one or more cameras (e.g., 2D/3D cameras, depth-sensing cameras, etc.), one or more sensors (e.g., biometric sensors, motion sensors, etc.), one or more microphones, etc. Further, in one embodiment, upon facing the camera, the user may be displayed an avatar/image of self (such as the user's face) which may be normal/clear or blurred, as desired or necessitated. In another embodiment, no image or avatar is displayed and, in yet another embodiment, sound may be played, such as due to system limitations, our of respect for the user's disability (such as blindness, etc.), etc.

Upon receiving the relevant data, at block 405, in one embodiment, smart mechanism 110 of FIG. 1 performs one or more tasks as discussed with respect to FIG. 2 to determine whether the face in the video is a human face. If not, method 400 continues with receiving additional or supplemental CAPTCHA/RTT information relating to the user at block 403. If yes, at block 407, another determination is made with regard to the liveness of the human face, such as although the face may that be of a human, as determined at block 405, but one or more anti-spoofing tests are performed to further determine whether the human face is merely portrayed through a trick or an imagery, such as a photograph, or that it is truly that of a live person, such as the user. If not, method 400 continues with receiving additional or supplemental CAPTCHA/RTT information relating to the user at block 403.

If yes, such as the face is that of a live human, in one embodiment, an optional process may be performed to match any recorded movements with animation at block 409. For example, as previously discussed, in some embodiment, an added layer of security may be employed to ask the user to perform certain tasks, such as to mimic one or more motions or certain movements, to further verify the legitimacy or authenticity of the user that is in addition to simply concluding that the face is that of a live user. As aforementioned, this process of block 409 may be option and thus, may or may not be performed as desired or necessitated, such as this additional security layer may be employed if required by a certain website (e.g., banking website, etc.) or when accessing a sensitive file (e.g., human resources file at a company), but may not be required when simply opening an online email account (e.g., Gmail®, Yahoo!® mail, Outlook®, etc.).

In one embodiment, if the user movements are not matched with those at the database and thus, the authentication process fails, method 400 continues with block 403 with receiving of additional or supplemental CAPTCHA/RTT information relating to the user. If, however, the movements are accepted or the process of block 411 is not employed, the user passes CAPTCHA/RTT and is approved and allowed to proceed; subsequently, method 400 ends at block 413.

Figure 5:
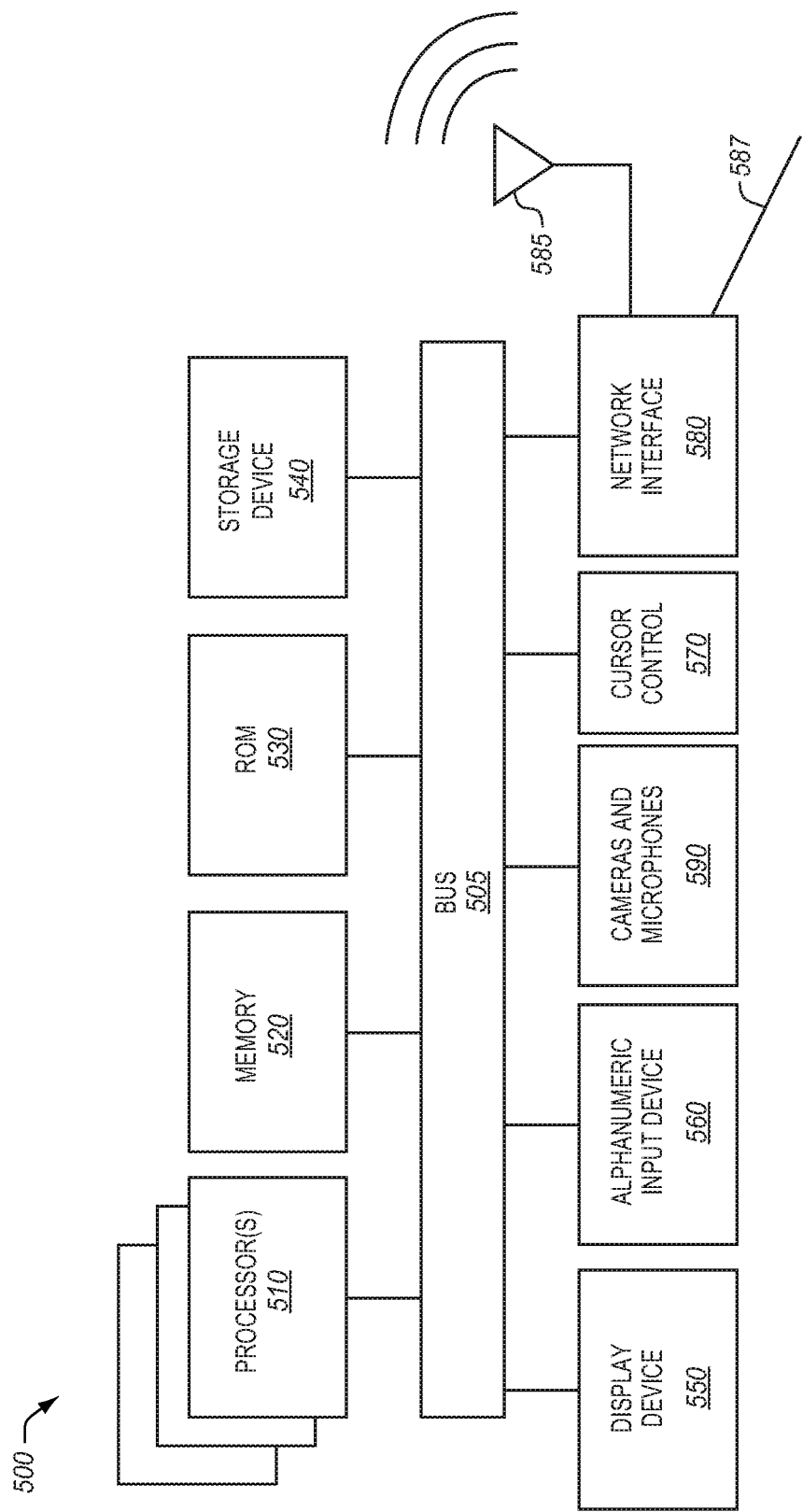
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
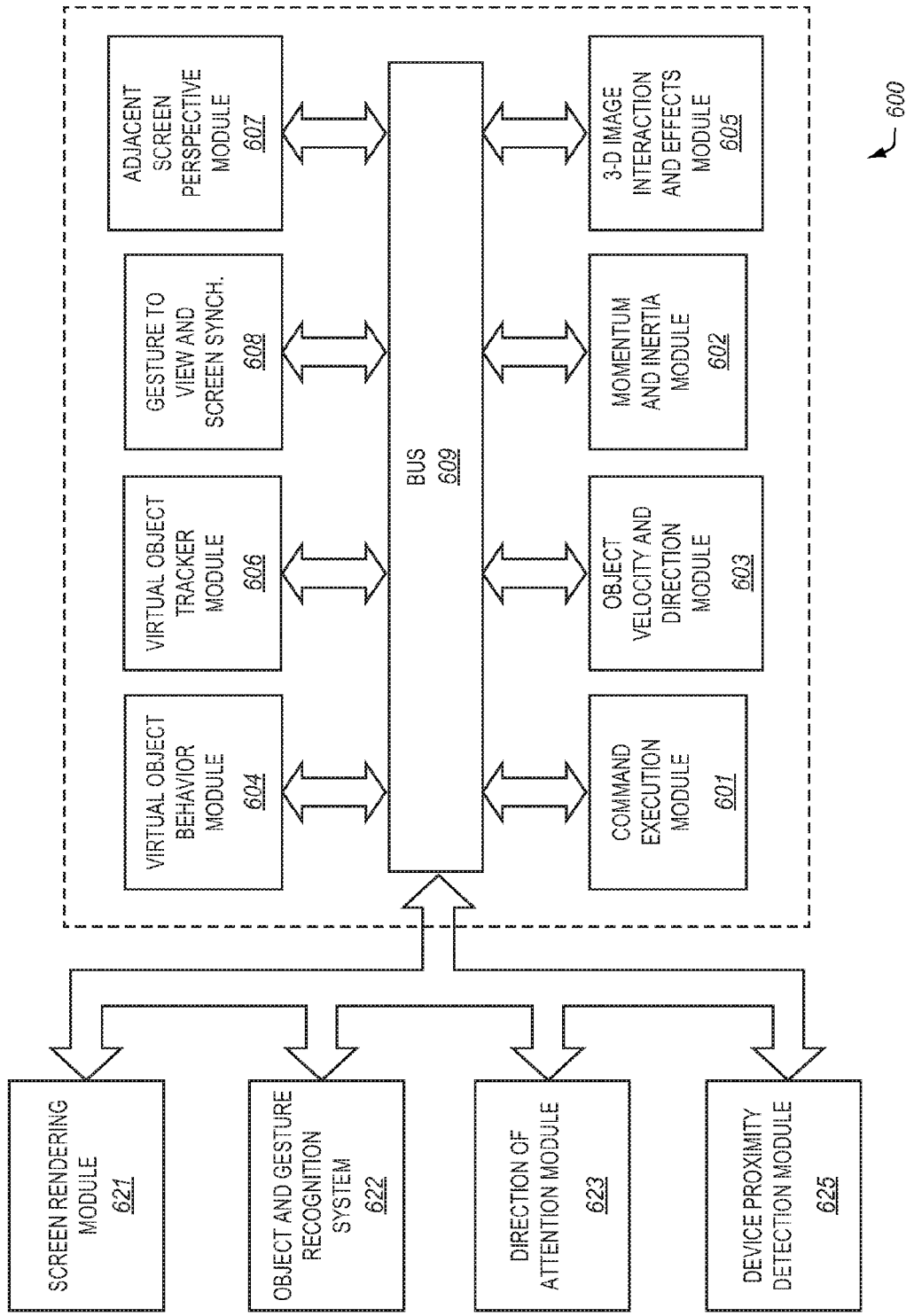
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or) out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate fair, secured, and efficient completely automated public turing test to tell computers and humans apart (CAPTCHA), comprising: detection/reception logic to receive distinctive data relating to a user, wherein the distinctive data includes a video clip of the user, wherein the distinguishing data is captured using one or more cameras; recognition logic of evaluation engine to recognize one or more features of the user from the video clip to determine whether the user is a human; testing/anti-spoofing logic of the evaluation engine to test one or more characteristics of the user or the video clip to determine whether the human is a live human; and application/execution logic to allow access to the user to an application, if the user is determined to be the live human.

Example 2 includes the subject matter of Example 1, wherein the recognition logic is further to determine whether the user in the video clip is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

Example 3 includes the subject matter of Example 1 or 2, wherein the video clip of the user shows a face of the user for a period of time, wherein the video clip includes another part of the user's body including one or more hands, one or more of the eyes, one or more fingers, and one or more tips of the one or more fingers, wherein the distinctive data further includes a still image of the user, a sound of words uttered by the user, a random noise made by the user, and a bodily movement made by the user, wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database, wherein the video clip further includes images obtained using infrared (IR) sensing components such that a heat pattern consistent with live humans is matched, and wherein the video clip further includes an ultrasonic reflection of an object returning reflection patterns consistent with a shape of a human face or other body parts.

Example 4 includes the subject matter of Example 1 or 2, wherein the application/execution logic is further to refuse the user from gaining the access, if the user is determined to be the non-human.

Example 5 includes the subject matter of Example 1, wherein the testing/anti-spoofing logic is further to run one or more anti-spoofing tests based on the one or more characteristics to determine whether the user is a non-live human, wherein the non-live human includes a photograph of the user such that the video clip shows the photograph of the user and not the user, wherein the one or more characteristics include blinking of the eyes, glare in the eyes, reflection of the user, and perspiration on skin of the user.

Example 6 includes the subject matter of Example 1 or 5, wherein the application/execution logic is further to refuse the user from gaining the access, if the user is determined to be the non-live human.

Example 7 includes the subject matter of Example 1, further comprising: security logic to authenticate the user or a computing device accessible to the user, wherein authenticating the user or the computing device includes verifying credentials of the user or the computing device prior to offering or refusing the access; and movement logic to authenticate the bodily movement of the user, wherein the bodily movement includes one or more of moving the face of the user, waving a hand of the user, and turning a head of the user to show an ear of the user to the one or more cameras.

Example 8 includes the subject matter of Example 1, further comprising: user interface logic to facilitate a user interface to receive one or more images of the user, via the one or more cameras, and wherein the user interface is further to display the one or more images of the user back to the user via a display screen; and communication/compatibility logic to facilitate communication of one or more of the distinctive data and the allowing or refusing of the access.

Example 9 includes the subject matter of Example 1, wherein the distinctive data comprises Completely Automated Public Turing Test to Tell Computers and Humans Apart (CAPTCHA) information, and wherein the CAPTCHA information includes Reverse Turing Test (RTT) information.

Some embodiments pertain to Example 10 that includes a method for facilitating fair, secured, and efficient completely automated public turing test to tell computers and humans apart (CAPTCHA), comprising: receiving distinctive data relating to a user, wherein the distinctive data includes a video clip of the user, wherein the distinguishing data is captured using one or more cameras; recognizing one or more features of the user from the video clip to determine whether the user is a human; testing one or more characteristics of the user or the video clip to determine whether the human is a live human; and allowing access to the user to an application, if the user is determined to be the live human.

Example 11 includes the subject matter of Example 10, wherein recognizing comprises determining whether the user in the video clip is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

Example 12 includes the subject matter of Example 10 or 11, wherein the video clip of the user shows a face of the user for a period of time, wherein the video clip includes another part of the user's body including one or more hands, one or more of the eyes, one or more fingers, and one or more tips of the one or more fingers, wherein the distinctive data further includes a still image of the user, a sound of words uttered by the user, a random noise made by the user, and a bodily movement made by the user, wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database, wherein the video clip further includes images obtained using infrared (IR) sensing components such that a heat pattern consistent with live humans is matched, and wherein the video clip further includes an ultrasonic reflection of an object returning reflection patterns consistent with a shape of a human face or other body parts.

Example 13 includes the subject matter of Example 10 or 11, further comprising refusing the user from gaining the access, if the user is determined to be the non-human.

Example 14 includes the subject matter of Example 10, further comprising running one or more anti-spoofing tests based on the one or more characteristics to determine whether the user is a non-live human, wherein the non-live human includes a photograph of the user such that the video clip shows the photograph of the user and not the user, wherein the one or more characteristics include blinking of the eyes, glare in the eyes, reflection of the user, and perspiration on skin of the user.

Example 15 includes the subject matter of Example 10 or 14, further comprising refusing the user from gaining the access, if the user is determined to be the non-live human.

Example 16 includes the subject matter of Example 10, further comprising: authenticating the user or a computing device accessible to the user, wherein authenticating the user or the computing device includes verifying credentials of the user or the computing device prior to offering or refusing the access; and authenticating the bodily movement of the user, wherein the bodily movement includes one or more of moving the face of the user, waving a hand of the user, and turning a head of the user to show an ear of the user to the one or more cameras.

Example 17 includes the subject matter of Example 10, further comprising: facilitating a user interface to receive one or more images of the user, via the one or more cameras, and wherein the user interface is further to display the one or more images of the user back to the user via a display screen; and facilitating communication of one or more of the distinctive data and the allowing or refusing of the access.

Example 18 includes the subject matter of Example 10, wherein the distinctive data comprises Completely Automated Public Turing Test to Tell Computers and Humans Apart (CAPTCHA) information, and wherein the CAPTCHA information includes Reverse Turing Test (RTT) information.

Some embodiments pertain to Example 19 includes a system comprising a storage device having instructions, and a processor to execute the instructions to facilitate a mechanism to: receive distinctive data relating to a user, wherein the distinctive data includes a video clip of the user, wherein the distinguishing data is captured using one or more cameras; recognize one or more features of the user from the video clip to determine whether the user is a human; test one or more characteristics of the user or the video clip to determine whether the human is a live human; and allow access to the user to an application, if the user is determined to be the live human.

Example 20 includes the subject matter of Example 19, wherein the mechanism is further to determine whether the user in the video clip is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

Example 21 includes the subject matter of Example 19 or 20, wherein the video clip of the user shows a face of the user for a period of time, wherein the video clip includes another part of the user's body including one or more hands, one or more of the eyes, one or more fingers, and one or more tips of the one or more fingers, wherein the distinctive data further includes a still image of the user, a sound of words uttered by the user, a random noise made by the user, and a bodily movement made by the user, wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database, wherein the video clip further includes images obtained using infrared (IR) sensing components such that a heat pattern consistent with live humans is matched, and wherein the video clip further includes an ultrasonic reflection of an object returning reflection patterns consistent with a shape of a human face or other body parts.

Example 22 includes the subject matter of Example 19 or 20, wherein the mechanism is further to refuse the user from gaining the access, if the user is determined to be the non-human.

Example 23 includes the subject matter of Example 19, wherein the mechanism is further to run one or more anti-spoofing tests based on the one or more characteristics to determine whether the user is a non-live human, wherein the non-live human includes a photograph of the user such that the video clip shows the photograph of the user and not the user, wherein the one or more characteristics include blinking of the eyes, glare in the eyes, reflection of the user, and perspiration on skin of the user.

Example 24 includes the subject matter of Example 19 or 23, wherein the mechanism is further to refuse the user from gaining the access, if the user is determined to be the non-live human.

Example 25 includes the subject matter of Example 19, wherein the mechanism is further to: authenticate the user or a computing device accessible to the user, wherein authenticating the user or the computing device includes verifying credentials of the user or the computing device prior to offering or refusing the access; and authenticate the bodily movement of the user, wherein the bodily movement includes one or more of moving the face of the user, waving a hand of the user, and turning a head of the user to show an ear of the user to the one or more cameras.

Example 26 includes the subject matter of Example 19, wherein the mechanism is further to: facilitate a user interface to receive one or more images of the user, via the one or more cameras, and wherein the user interface is further to display the one or more images of the user back to the user via a display screen; and facilitate communication of one or more of the distinctive data and the allowing or refusing of the access.

Example 27 includes the subject matter of Example 19, wherein the distinctive data comprises Completely Automated Public Turing Test to Tell Computers and Humans Apart (CAPTCHA) information, and wherein the CAPTCHA information includes Reverse Turing Test (RTT) information.

Some embodiments pertain to Example 28 includes an apparatus comprising: means for receiving distinctive data relating to a user, wherein the distinctive data includes a video clip of the user, wherein the distinguishing data is captured using one or more cameras; means for recognizing one or more features of the user from the video clip to determine whether the user is a human; means for testing one or more characteristics of the user or the video clip to determine whether the human is a live human; and means for allowing access to the user to an application, if the user is determined to be the live human.

Example 29 includes the subject matter of Example 28, wherein the means for recognizing comprises means for determining whether the user in the video clip is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

Example 30 includes the subject matter of Example 28, wherein the video clip of the user shows a face of the user for a period of time, wherein the video clip includes another part of the user's body including one or more hands, one or more of the eyes, one or more fingers, and one or more tips of the one or more fingers, wherein the distinctive data further includes a still image of the user, a sound of words uttered by the user, a random noise made by the user, and a bodily movement made by the user, wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database, wherein the video clip further includes images obtained using infrared (IR) sensing components such that a heat pattern consistent with live humans is matched, and wherein the video clip further includes an ultrasonic reflection of an object returning reflection patterns consistent with a shape of a human face or other body parts.

Example 31 includes the subject matter of Example 28, further comprising means for refusing the user from gaining the access, if the user is determined to be the non-human.

Example 32 includes the subject matter of Example 28, further comprising means for running one or more anti-spoofing tests based on the one or more characteristics to determine whether the user is a non-live human, wherein the non-live human includes a photograph of the user such that the video clip shows the photograph of the user and not the user, wherein the one or more characteristics include blinking of the eyes, glare in the eyes, reflection of the user, and perspiration on skin of the user.

Example 33 includes the subject matter of Example 32, further comprising means for refusing the user from gaining the access, if the user is determined to be the non-live human.

Example 34 includes the subject matter of Example 28, further comprising: means for authenticating the user or a computing device accessible to the user, wherein authenticating the user or the computing device includes verifying credentials of the user or the computing device prior to offering or refusing the access; and means for authenticating the bodily movement of the user, wherein the bodily movement includes one or more of moving the face of the user, waving a hand of the user, and turning a head of the user to show an ear of the user to the one or more cameras.

Example 35 includes the subject matter of Example 28, further comprising: means for facilitating a user interface to receive one or more images of the user, via the one or more cameras, and wherein the user interface is further to display the one or more images of the user back to the user via a display screen; and means for facilitating communication of one or more of the distinctive data and the allowing or refusing of the access.

Example 36 includes the subject matter of Example 28, wherein the distinctive data comprises Completely Automated Public Turing Test to Tell Computers and Humans Apart (CAPTCHA) information, and wherein the CAPTCHA information includes Reverse Turing Test (RTT) information.

Example 37 includes at least one non-transitory machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus, comprising:
    at least one health-monitoring sensor to evaluate a user for one or more types of disability;
    command execution circuitry to trigger, responsive to the evaluation of the user, at least one smart captcha test of a plurality of available smart captcha tests, wherein the at least one smart captcha test is selected from the plurality of available smart captcha tests based at least on an identified type of disability associated with the user;
    detection/reception circuitry to, upon the at least one smart captcha test being triggered, receive distinctive data relating to the user;
    evaluation circuitry including at least recognition circuitry to recognize one or more features of the user from the distinctive data to determine whether the user is a human;
    testing/anti-spoofing circuitry of the evaluation circuitry to test one or more characteristics of at least one of the user or the distinctive data to determine a result that the human is a live human;
    security circuitry to determine if secure access to an application is being requested by the user;
    movement circuitry to, upon determining that the secure access is being requested by the user, present a request to the user to perform a random or planned movement, and authenticate the user based at least in part on the random or planned movement matching with a corresponding movement in a feature recognition database; and
    application/execution circuitry to allow the secure access of the user to the application based on the determined result and the authentication of the user.

2. The apparatus of claim 1, wherein the distinctive data includes a video clip of the user captured using one or more cameras communicatively coupled to the apparatus, wherein the recognition circuitry is further to determine based on the video clip whether the user is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

3. The apparatus of claim 1, wherein the distinctive data includes a video clip of the user captured using one or more cameras communicatively coupled to the apparatus, wherein the video clip of the user shows a face of the user for a period of time, wherein the video clip includes another part of a body of the user including one or more hands, one or more eyes, one or more fingers, and one or more tips of the one or more fingers, wherein the distinctive data further includes a still image of the user, a sound of words uttered by the user, a random noise made by the user, and a bodily movement made by the user,
    wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database,
    wherein the video clip further includes images obtained using infrared (IR) sensing components such that a heat pattern consistent with live humans is matched, and
    wherein the video clip further includes an ultrasonic reflection of an object returning reflection patterns consistent with a shape of a human face or other body parts.

4. The apparatus of claim 2, wherein the application/execution circuitry is further to refuse the user from gaining the secure access, if the user is determined to be the non-human.

5. The apparatus of claim 1, wherein the testing/anti-spoofing circuitry is further to run one or more anti-spoofing tests based on the one or more characteristics to determine whether the user is a non-live human, wherein the distinctive data includes a photograph of the user, and wherein the one or more characteristics include one or more of a group that includes frequency and speed of blinking of eyes, glare in the eyes, reflection of the user, or perspiration on skin of the user.

6. The apparatus of claim 5, wherein the application/execution circuitry is further to refuse the user from gaining the secure access, if the user is determined to be the non-live human.

7. The apparatus of claim 1,
    wherein the security circuitry is to authenticate the user or a computing device accessible to the user, wherein authenticating the user or the computing device includes verifying credentials of the user or the computing device prior to offering or refusing the secure access; and
    the movement circuitry is to authenticate a bodily movement of the user, wherein the bodily movement includes one or more of moving a face of the user, waving a hand of the user, and turning a head of the user to show an ear of the user to the one or more cameras.

8. The apparatus of claim 1, further comprising:
    user interface circuitry to facilitate a user interface to receive one or more images of the user via one or more cameras communicatively coupled to the apparatus, and wherein the user interface is further to display the one or more images of the user back to the user via a display screen; and communication/compatibility circuitry to facilitate communication of one or more of the distinctive data and the allowing or refusing of the secure access.

9. The apparatus of claim 1, wherein the distinctive data comprises Completely Automated Public Turing Test to Tell Computers and Humans Apart (CAPTCHA) information, and wherein the CAPTCHA information includes Reverse Turing Test (RTT) information.

10. A method, comprising:
evaluating a user for one or more types of disability using at least one health-monitoring sensor;
triggering, responsive to the evaluating of the user, at least one smart captcha test of a plurality of available smart captcha tests, wherein the at least one smart captcha test is selected from the plurality of available smart captcha tests based at least on an identified type of disability associated with the user;
upon smart captcha being triggered, receiving distinctive data relating to the user;
recognizing one or more features of the user from the distinctive data to determine whether the user is a human;
testing one or more characteristics of at least one of the user or the distinctive data to determine a result that the human is a live human;
determining if secure access to an application is being requested by the user;
upon determining that the secure access is being requested by the user, presenting a request to the user to perform a random or planned movement, and authenticating the user based at least in part on the random or planned movement matching with a corresponding movement in a feature recognition database; and
allowing the secure access of the user to the application based on the determined result and the authentication of the user.

11. The method of claim 10, wherein the distinctive data includes a video clip of the user, wherein the recognizing comprises determining based on the video clip whether the user is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

12. The method of claim 10, wherein the distinctive data includes a video clip of the user, wherein the video clip of the user shows a face of the user for a period of time, wherein the video clip includes another part of a body of the user including one or more hands, one or more eyes, one or more fingers, and one or more tips of the one or more fingers, wherein the distinctive data further includes a still image of the user, a sound of words uttered by the user, a random noise made by the user, and a bodily movement made by the user,
wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database,
wherein the video clip further includes images obtained using infrared (IR) sensing components such that a heat pattern consistent with live humans is matched, and wherein the video clip further includes an ultrasonic reflection of an object returning reflection patterns consistent with a shape of a human face or other body parts.

13. The method of claim 11, further comprising refusing the user from gaining the secure access, if the user is determined to be the non-human.

14. The method of claim 10, further comprising running one or more anti-spoofing tests based on the one or more characteristics to determine whether the user is a non-live human, wherein the distinctive data includes a photograph of the user, and wherein the one or more characteristics include one or more of a group that includes frequency and speed of blinking of eyes, glare in the eyes, reflection of the user, or perspiration on skin of the user.

15. The method of claim 14, further comprising refusing the user from gaining the secure access, if the user is determined to be the non-live human.

16. The method of claim 10, further comprising:
authenticating the user or a computing device accessible to the user, wherein authenticating the user or the computing device includes verifying credentials of the user or the computing device prior to offering or refusing the secure access; and
authenticating a bodily movement of the user, wherein the bodily movement includes one or more of moving a face of the user, waving a hand of the user, and turning a head of the user to show an ear of the user to the one or more cameras.

17. The method of claim 10, further comprising:
facilitating a user interface to receive one or more images of the user via one or more cameras, and wherein the user interface is further to display the one or more images of the user back to the user via a display screen; and
facilitating communication of one or more of the distinctive data and the allowing or refusing of the secure access.

18. The method of claim 10, wherein the distinctive data comprises Completely Automated Public Turing Test to Tell Computers and Humans Apart (CAPTCHA) information, and wherein the CAPTCHA information includes Reverse Turing Test (RTT) information.

19. At least one non-transitory machine-readable storage medium comprising a plurality of instructions stored thereon, the instructions when executed on a computing device, cause the computing device to:
evaluate a user for one or more types of disability using at least one health-monitoring sensor;
trigger, responsive to the evaluation of the user, at least one smart captcha test of a plurality of available smart captcha tests, wherein the at least one smart captcha test is selected from the plurality of available smart captcha tests based at least on an identified type of disability associated with the user;
upon smart captcha being triggered, receive distinctive data relating to the user;
recognize one or more features of the user from the distinctive data to determine whether the user is a human;
test one or more characteristics of at least one of the user or the distinctive data to determine a result that the human is a live human;
determine if secure access to an application is being requested by the user;
upon determining that the secure access is being requested by the user, present a request to the user to perform a random or planned movement, and authenticate the user based at least in part on the random or planned movement matching with a corresponding movement in a feature recognition database; and allow the secure access of the user to the application based on the determined result and the authentication of the user.

20. The machine-readable medium of claim 19, wherein the distinctive data includes a video clip of the user, wherein the computing device is further to determine based on the video clip whether the user is a non-human including a computing machine, a robot, and an object, wherein the one or more features include one or more physical features associated with humans, wherein the one or more physical features include distance between eyes, placement of pupils in the eyes, shape of a nose, fullness or placement of lips, and distance between a lower part of the nose and a top lip of the lips.

21. The machine-readable medium of claim 19, wherein the distinctive data includes a video clip of the user, wherein the video clip of the user shows a face of the user for a period of time, wherein the video clip includes another part of a body of the user including one or more hands, one or more eyes, one or more fingers, and one or more tips of the one or more fingers, wherein the distinctive data further includes a still image of the user, a sound of words uttered by the user, a random noise made by the user, and a bodily movement made by the user, wherein the video clip includes a three-dimensional (3D) depth-sensing video clip obtained using a depth-sensing camera of the one or more cameras, wherein the 3D depth-sensing video clip provides a 2D special representation of facial features capable of being verified according to a plurality of 3D human features at a database, wherein the video clip further includes images obtained using infrared (IR) sensing components such that a heat pattern consistent with live humans is matched, and wherein the video clip further includes an ultrasonic reflection of an object returning reflection patterns consistent with a shape of a human face or other body parts.

22. The machine-readable medium of claim 20, wherein the computing device is further to refuse the user from gaining the secure access, if the user is determined to be the non-human.

23. The machine-readable medium of claim 19, wherein the computing device is further to run one or more anti-spoofing tests based on the one or more characteristics to determine whether the user is a non-live human, wherein the distinctive data includes a photograph of the user, and wherein the one or more characteristics include one or more of a group that includes frequency and speed of blinking of eyes, glare in the eyes, reflection of the user, or perspiration on skin of the user.

24. The machine-readable medium of claim 19, wherein the computing device is further to:

authenticate the user or the computing device accessible to the user, wherein authenticating the user or the computing device includes verifying credentials of the user or the computing device prior to offering or refusing the secure access;

authenticate a bodily movement of the user, wherein the bodily movement includes one or more of moving a face of the user, waving a hand of the user, and turning a head of the user to show an ear of the user to the one or more cameras;

facilitate a user interface to receive one or more images of the user, via the one or more cameras, and wherein the user interface is further to display the one or more images of the user back to the user via a display screen; and facilitate communication of one or more of the distinctive data and the allowing or refusing of the secure access.

25. The apparatus of claim 1, wherein the distinctive data includes a video clip of the user, and wherein the recognition circuitry is further configured to control a display unit to display at least one frame that is generated based on a modification of the video clip during the capture of the distinctive data.

* * * * *